(12) United States Patent
Long

(10) Patent No.: US 11,285,852 B2
(45) Date of Patent: Mar. 29, 2022

(54) AUTOMOBILE HEADREST

(71) Applicant: Qinglv Long, Hunan (CN)

(72) Inventor: Qinglv Long, Hunan (CN)

(73) Assignee: Shenzhen Longzin industrial Co., Ltd., Shenzhen (CN)

( * ) Notice: Subject to any disclaimer, the term of this patent is extended or adjusted under 35 U.S.C. 154(b) by 0 days.

(21) Appl. No.: 17/009,722

(22) Filed: Sep. 1, 2020

(65) Prior Publication Data

US 2021/0138948 A1    May 13, 2021

(30) Foreign Application Priority Data

Nov. 7, 2019    (CN) .......................... 201921925894.X

(51) Int. Cl.
| | | |
|---|---|---|
| *B60N 2/80* | (2018.01) | |
| *B60N 2/879* | (2018.01) | |
| *B60N 2/838* | (2018.01) | |
| *B60N 2/812* | (2018.01) | |

(52) U.S. Cl.
CPC ............. *B60N 2/879* (2018.02); *B60N 2/812* (2018.02); *B60N 2/838* (2018.02)

(58) Field of Classification Search
CPC ........ B60N 2/879; B60N 2/812; B60N 2/847; B60N 2/856; B60N 2/838; B60N 2/868; B60N 2/885; B60N 2/809; B60N 2/865; B60N 2/882; B60N 2205/30; A47C 7/38; A47C 7/383
USPC ....................................................... 297/410
See application file for complete search history.

(56) References Cited

U.S. PATENT DOCUMENTS

| | | | | |
|---|---|---|---|---|
| 4,205,878 A | * | 6/1980 | Wooten | B60N 2/99 297/391 |
| 5,370,446 A | * | 12/1994 | Bancod | A47C 7/38 297/408 |
| 5,904,405 A | * | 5/1999 | Wu | B60N 2/818 297/391 |
| 11,008,106 B2 | * | 5/2021 | Parrilla Calle | B60N 2/841 |
| 2014/0312672 A1 | * | 10/2014 | Scolari | B60R 11/00 297/391 |
| 2015/0375652 A1 | * | 12/2015 | Scolari | B60N 2/865 297/188.01 |

FOREIGN PATENT DOCUMENTS

GB      2302268    *    1/1997

* cited by examiner

*Primary Examiner* — Mark R Wendell

(57) ABSTRACT

The invention discloses an automobile headrest, comprising a shell, support arms, and a seat fixing part; the seat fixing part is arranged on the shell for fixing with the fixing rod on the automobile seat; each support arm is provided with a rotating shaft and a sliding shaft; the sliding shaft slides in a slideway inside the shell; one end of the sliding shaft is rotatably connected to the rotating shaft through a rotating structure; the support arm is slidably installed in the shell through the sliding shaft; the width between the support arms is adjusted laterally through the sliding shaft. The invention realizes the distance adjustment between the support arms through the lateral movement of the sliding shaft, realizes a better lateral adjustment of the sliding shaft through the design of the locking plate, the concave-convex part and the like, and realizes a better degree of freedom and comfort.

13 Claims, 17 Drawing Sheets

AUTOMOBILE HEADREST

BACKGROUND OF THE INVENTION

1. Field of the Invention

The invention relates to an automobile article, in particular to an automobile headrest.

2. Description of the Related Art

With the ever-improving living environment, people's requirements for health and comfort of life increase, the use of automobiles increases, and automobile headrests are increasingly favored by people, and people's demand for headrests is also increasing.

The patent with a patent number of 201821057064.5 discloses a device that is leaned on to collapsible rotatory side for car seat is last, but the support arm is leaned on to fixed establishment, reinforcing bracket and side including connecting pedestal slide adjusting interval, the support arm is leaned on at connection pedestal both ends articulated being provided with side respectively, connection pedestal one side is provided with and is used for fixing the fixed establishment on the car seat headrest support column, reinforcing bracket has been set firmly relatively with fixed establishment on connecting the pedestal. The utility model discloses can make the device fix on the car seat headrest support column, the fixed establishment interval can be adjusted, can adapt to different car seat, adjusts simple and conveniently, and messenger people that can be better sits the travelling comfort of rest under the state of standing, improvement seat in the car.

The patent above and the prior art solutions do not appear movement within the lateral range of the support arm through the movement of the sliding shaft, which increases the specific effect of lateral adjustment for different groups of people.

SUMMARY OF THE INVENTION

The technical problem to be solved by the invention is to provide an automobile headrest, which can effectively solve the deficiencies in the prior art.

The invention is realized by the following technical solutions: an automobile headrest, comprising a shell, support arms, and a seat fixing part, wherein the seat fixing part is arranged on the shell for fixing with the fixing rod on the automobile seat; each support arm is provided with a rotating shaft and a sliding shaft; the sliding shaft slides in a slideway inside the shell, and one end of the sliding shaft is rotatably connected to the rotating shaft through a rotating structure; the support arm is slidably installed in the shell through the sliding shaft, and the width between the support arms is adjusted laterally through the sliding shaft.

Preferably, the seat fixing part comprises a first fixing buckle and a second fixing buckle, and the fixing rod on the automobile seat is clamped by the first fixing buckle and the second fixing buckle; the first fixing buckle and the second fixing buckle are respectively provided with fixing clamping teeth; a fixing plate is connected to the upper part of the shell; the fixing plate is provided with corresponding clamping teeth, and the corresponding clamping teeth are engaged with the fixing clamping teeth.

Preferably, the fixing plate comprises a first fixing plate and a second fixing plate; the first fixing plate is hinged to the first fixing part on the shell, and the second fixing plate is hinged to the second fixing part on the shell; a containing groove is provided on the shell, and an elastic control part is provided in the containing groove.

Preferably, the elastic control part comprises an elastic member and a pushing part; one side of the elastic member is connected to the elastic member baffle provided on the shell, and the other side thereof is connected to the pushing part.

Preferably, the pushing part comprises a pushing post and a pushing clamping post; a pushing hole is provided on the first fixing plate and the second fixing plate; the pushing post passes through the pushing hole and moves in the pushing hole; a clamping post slot is provided on the first fixing plate and the second fixing plate, which pushes the clamping post to move inside and outside the clamping post slot; the pushing post is positioned on one side of the pushing hole under the action of the elastic force of the elastic member on the first fixing part and the second fixing part, and pushes the clamping post in the clamping post slot.

Preferably, the seat fixing part is further provided with a buckling device; one end of the buckling device is hinged to the seat fixing part to realize the relative rotation of the buckling device on the seat fixing part;

the other end of the buckling device is provided with a buckling point; a buckling concave groove is provided on the first fixing plate and the second fixing plate, and the buckling point enters the buckling concave groove to engage; the seat fixing part is provided with a containing slot, and two sides of the containing slot are provided with rotating holes; the buckling device is provided with a rotating post, and the rotating post passes through the rotating hole and rotates in the containing slot;

the buckling part is further provided with a toggling part; the buckling point is provided with a buckling inclined plane to buckle with the inclined groove provided on the bottom surface of the buckling concave groove.

Preferably, the sliding shaft is provided with a sliding part, and the shell is provided with a locking structure; the sliding part and the locking structure are fixed to realize the lateral movement of the sliding shaft; the locking structure comprises a locking plate; one side of the locking plate is provided with a concave-convex part, and the concave-convex part of the locking plate corresponds to the convex-concave part provided on the sliding part; the locking plate is compressed and fixed in the shell by screws.

Preferably, an elastic device is provided between the locking plate and the shell; when the protrusions in the concave-convex part contact the recesses in the convex-concave part, the elastic device gives an elastic force.

Preferably, the elastic device is a spring device, and the spring device is fixed by a limiting post provided on the other side of the concave-convex part of the locking plate.

Preferably, the rotating shaft is provided with a first insertion hole and a second insertion hole, and the support arm is arranged in one of the insertion holes.

Preferably, the middle of the shell is provided with a pendant sliding part, and the pendant is fixed to the shell through a nut structure; the pendant is provided with a sliding positioning wave point, and the pendant is provided with a bending part; the suspension and placement of objects are realized through the bending part; a mobile phone holder is further connected to the pendant, and a magnetic attraction component is provided on the mobile phone holder; the fixing of the mobile phone is realized by the adsorption of the magnetic component.

Preferably, a sliding groove is provided in the middle of the sliding shaft, and a sliding rod is bulged inside the shell; the sliding rod is slidably buckled into the sliding groove.

Preferably, the rotating structure is installed in the rotating shaft; the end surface of the sliding shaft is provided with a convex ring, and the middle of the convex ring is provided with a middle shaft with a hole; mounting grooves are symmetrically provided on the convex ring; the rotating structure is installed in the middle of the convex ring, and the rotating structure is partially buckled into the mounting groove.

Preferably, the rotating structure comprises two symmetrically arranged connecting members; a connecting post is arranged on the opposite side of the connecting member, and a spring is installed between the connecting posts on the adjacent sides; the two ends of the spring are in contact with the connecting member respectively; an arc-shaped convex part is formed on the connecting member, and the arc-shaped convex part is buckled into the mounting groove and partially protrudes out of the convex ring; more than one arc-shaped concave part is arranged on the inner wall surface of the rotating shaft, and the convex arc-shaped convex part is buckled into the arc-shaped concave part.

The advantageous effects of the invention are: the invention realizes the distance adjustment between the support arms through the lateral movement of the sliding shaft, realizes a better lateral adjustment of the sliding shaft through the design of the locking plate, the concave-convex part and the like, and realizes a better degree of freedom and comfort.

BRIEF DESCRIPTION OF THE DRAWINGS

In order to explain the embodiments of the invention or the technical solutions in the prior art more clearly, the drawings that need to be used in the description of the embodiments or the prior art will be briefly introduced hereinafter. Obviously, the drawings in the following description are only some embodiments of the invention. For those of ordinary skill in the art, other drawings may be obtained based on these drawings without creative efforts.

DETAILED DESCRIPTION OF THE PREFERRED EMBODIMENTS

Figure 1:
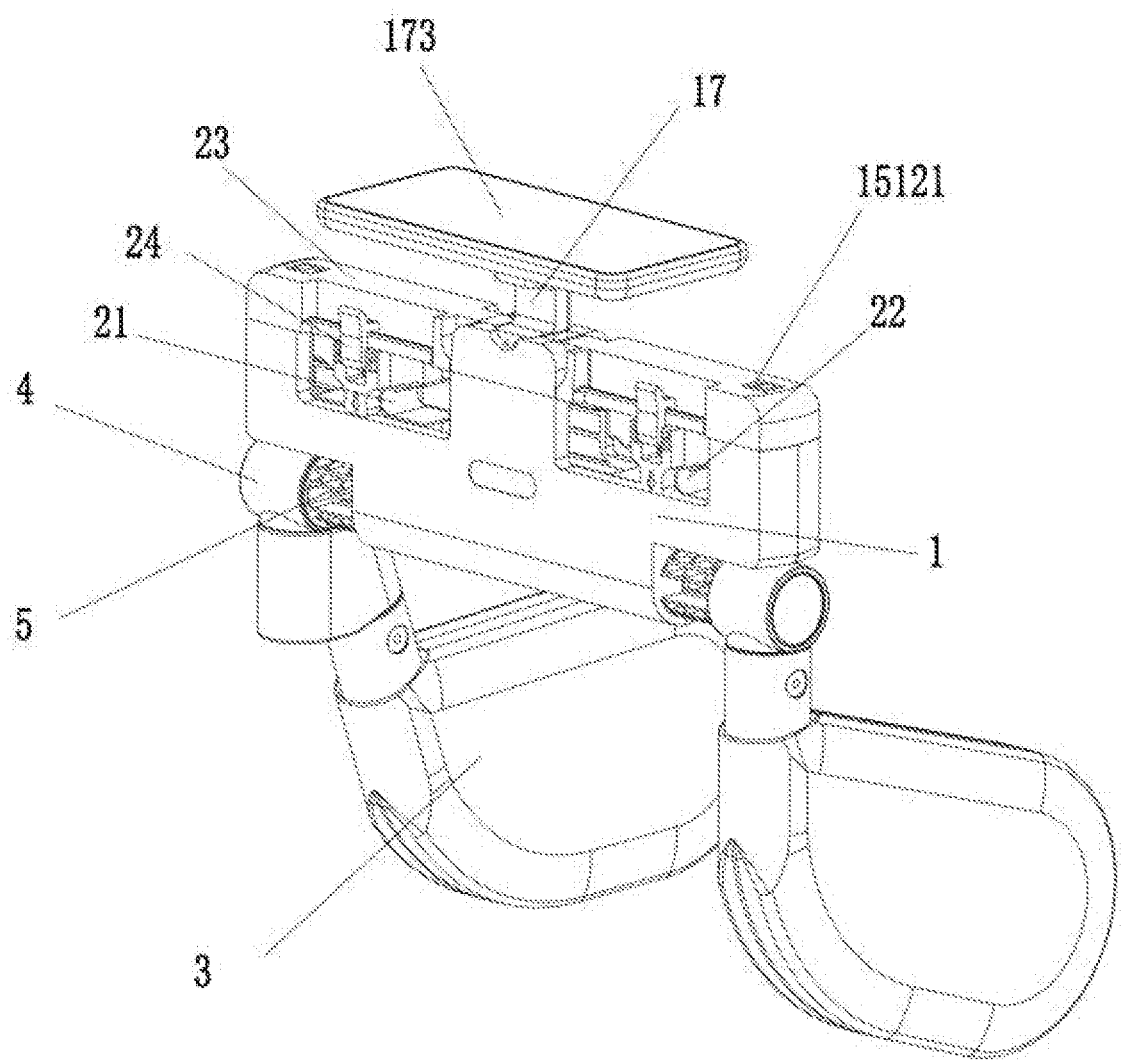
FIG. 1 is a schematic diagram of the overall structure of the invention.

All the features disclosed in the specification, or all disclosed methods or steps in the process, except for mutually exclusive features and/or steps, can be combined in any manner.

Any feature disclosed in the specification (including any appended claims, abstract and drawings), unless specifically stated, can be replaced by other equivalent or alternative features with similar purposes. That is, unless otherwise stated, each feature is just one example of a series of equivalent or similar features.

In the description of the invention, it should be understood that the orientation or positional relationship indicated by the terms "one end", "the other end", "outer", "upper", "inner", "horizontal", "coaxial", "central", "end", "length", "outer end", etc. are based on the orientation or positional relationship shown in the drawings, and are only for the convenience of describing the invention and simplifying the description, rather than indicating or implying that the pointed device or element must have a specific orientation, be configured and operated in a specific orientation, and therefore cannot be understood as a limitation of the invention.

In addition, in the description of the invention, "plurality" means at least two, such as two, three, etc., unless otherwise specifically defined.

The terms such as "upper", "above", "lower", "below" and the like used in the invention representing the relative position in space are used to describe the relationship of one unit or feature relative to another unit or feature as shown in the drawings for the purpose of facilitating explanation. The terms of the relative position in space may be intended to include different orientations of the device in use or operation other than those shown in the figures. For example, if a device in the figure is turned over, the unit described as being "lower" or "below" other units or features will be "above" the other units or features. Therefore, the exemplary term "below" can encompass both above and below orientations. The device can be oriented in other ways (rotated by 90 degrees or other orientations), and the space-related descriptions used in the article are explained accordingly In the invention, unless otherwise clearly defined and limited, the terms "provided", "socketed", "connected", "through", "plug" and other terms should be interpreted broadly; for example, it can be a fixed connection, it can be a detachable connection, or integrated; it can be a mechanical connection or an electrical connection; it can be a direct connection, or indirect connection through an intermediate medium, and it can be an internal communication between two elements or the interaction relationship between two elements, unless specifically defined otherwise. For those of ordinary skill in the art, the specific meaning of the above terms in the invention can be understood according to specific circumstances.

Figure 2:
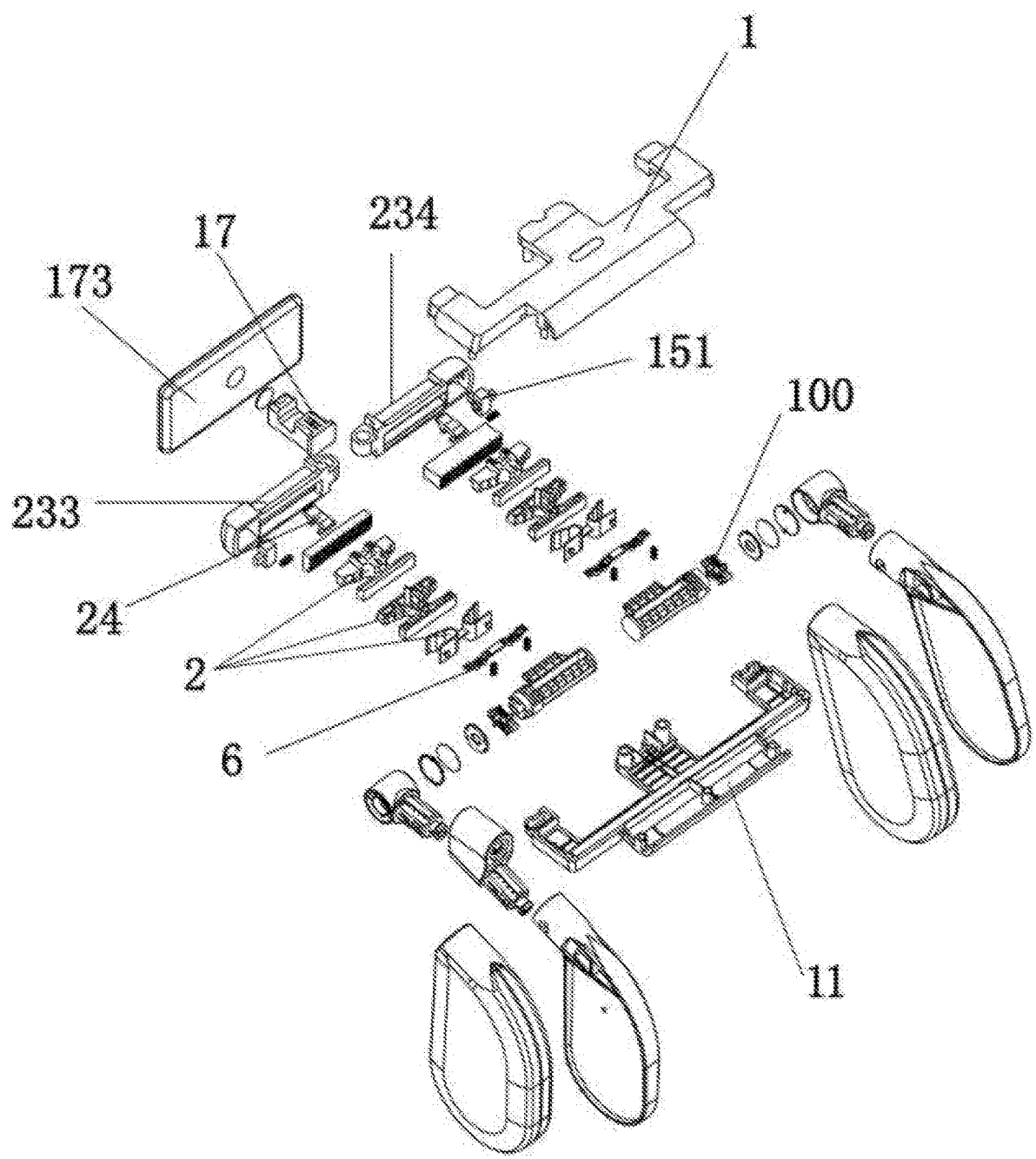
FIG. 2 is an exploded view of the invention.

As shown in FIG. 1-2, the automobile headrest provided by the invention comprises a shell 1, support arms 3, and a seat fixing part 2, wherein the seat fixing part 2 is arranged on the shell 1, and the rotating shaft 4 is fixed to the sliding shaft 5; the shell 1 is provided with a slideway 11, and the sliding shaft 5 can move laterally in the slideway 11; the lateral movement of the sliding shaft 5 adjusts the width between the support arms 3, which realizes different distance adjustments according to different groups of people.

Figure 4:
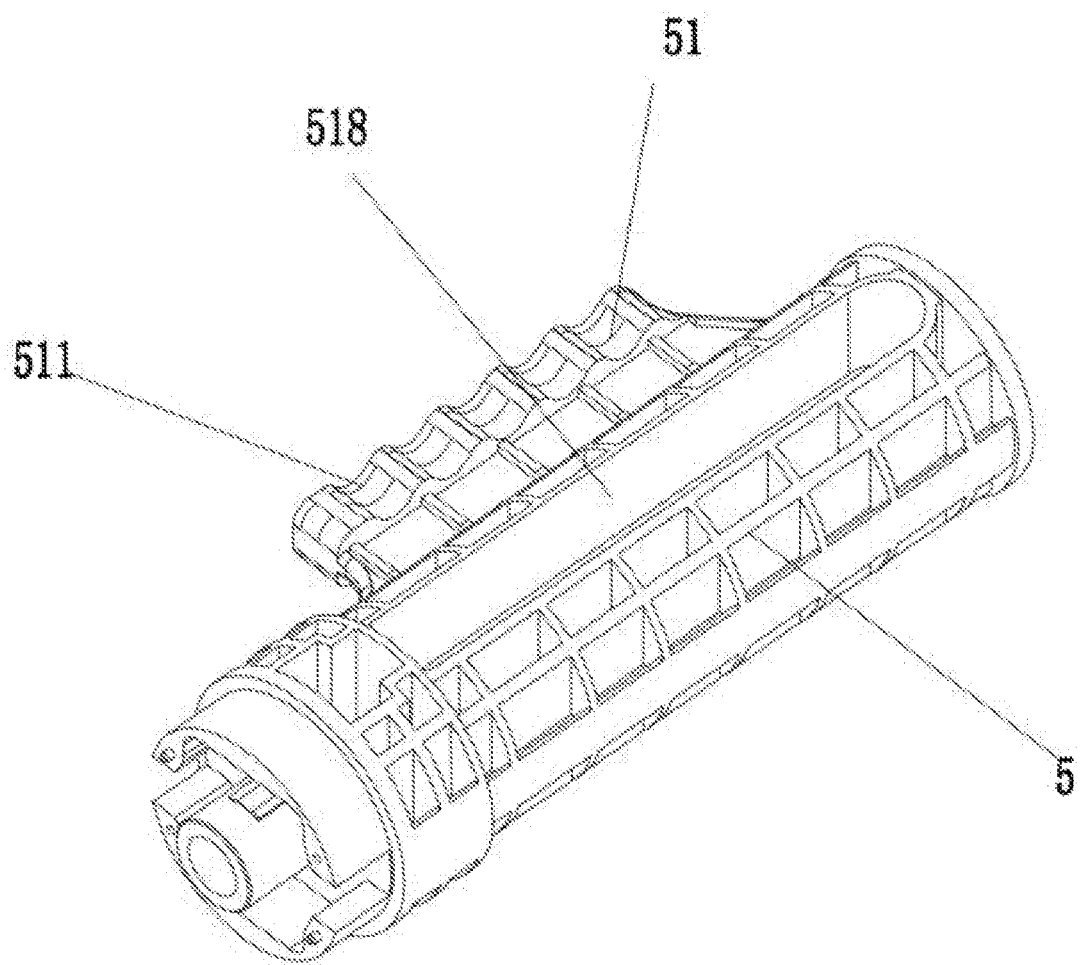
FIG. 4 is a schematic diagram of the structure of the sliding shaft of the invention.

As shown in FIG. 4, the sliding shaft 5 is provided with a sliding part 51, and the shell 1 is provided with a locking structure; the sliding part 51 and the locking structure are fixed to realize the lateral movement of the sliding shaft 5; the sliding part 51 prevents the sliding shaft 5 from sliding during the lateral movement in the practical process; a sliding groove 518 is provided in the middle of the sliding shaft, and a sliding rod is bulged inside the shell; the sliding rod is slidably buckled into the sliding groove 518; the sliding rod prevents rotation during the lateral movement.

Figure 7:
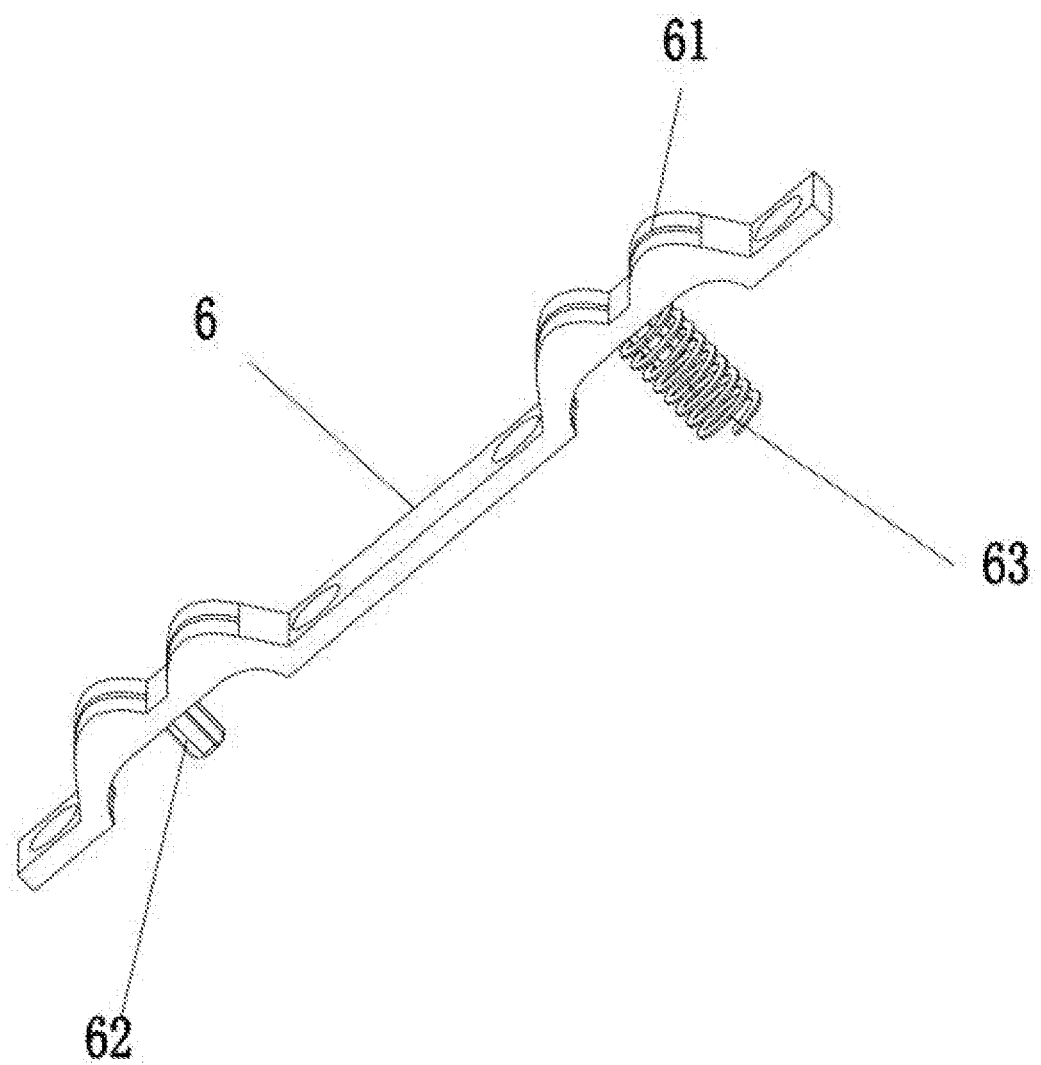
FIG. 7 is a schematic diagram of the structure of the locking plate of the invention.

As shown in FIGS. 4 and 7, the locking structure comprises a locking plate 6; one side of the locking plate 6 is provided with a concave-convex part 61, and the concave-convex part 61 of the locking plate 6 corresponds to the convex-concave part 511 provided on the sliding part 51; the locking plate 6 is compressed and fixed in the shell by screws; the limitation of the locking structure achieves a better lateral movement effect, and the cooperation between the concave-convex part 61 and the convex-concave part 511 realizes a limitation of the moving distance of the sliding shaft 5;

the locking plate 6 is provided with an elastic device; when the protrusions in the concave-convex part 61 contact the recesses in the convex-concave part 511, the elastic device gives an elastic force to facilitate the lateral movement of the sliding shaft 5 to avoid jamming; the elastic device of the invention is preferably a spring device 63, and the spring device 63 is fixed by a limiting post 62 provided on the other side of the concave-convex part 61 of the locking plate 6; the position of the elastic device is better fixed by the limiting post 62, and the service life of the parts is increased; the specific adjustment method is: pulling the rotating shaft 4 to drive the lateral movement of the sliding shaft 5, and adjusting the position of the sliding part 51 through the cooperation of the concave-convex portion 61 and the convex-concave portion 511.

Figure 6:
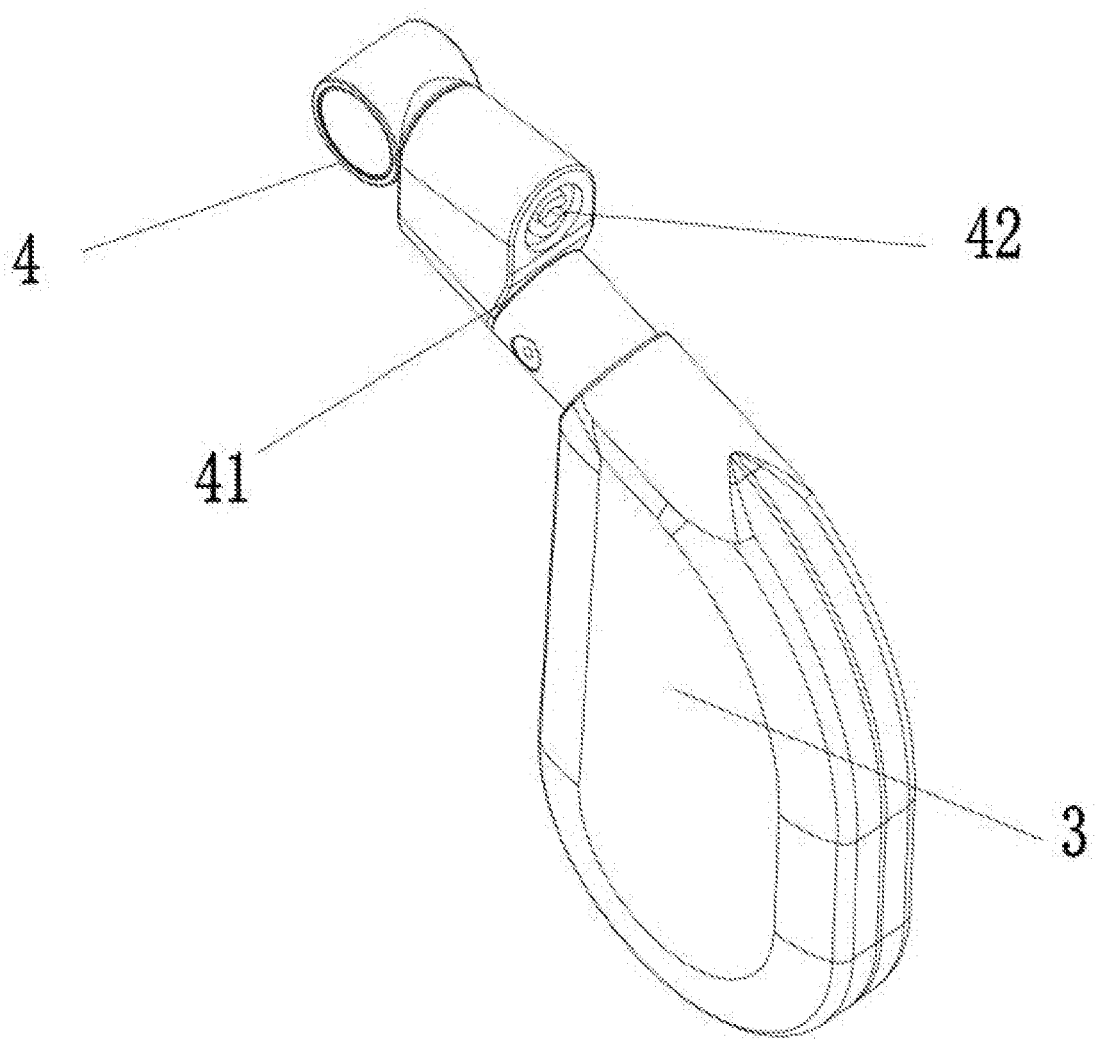
FIG. 6 is a schematic diagram of the assembly of the rotating shaft and the support arm of the invention.

The sliding shaft 5 and the rotating shaft 4 are rotatably connected to realize the relative rotation between the sliding shaft 5 and the rotating shaft 4; the rotating shaft 4 is provided with a first insertion hole 41 and a second insertion hole 42, and the rotating shaft 4 is provided with double holes, as shown in FIG. 6; the support arm 3 can be arranged in one of the holes for adjusting the position of the support arm 3.

Figure 5:
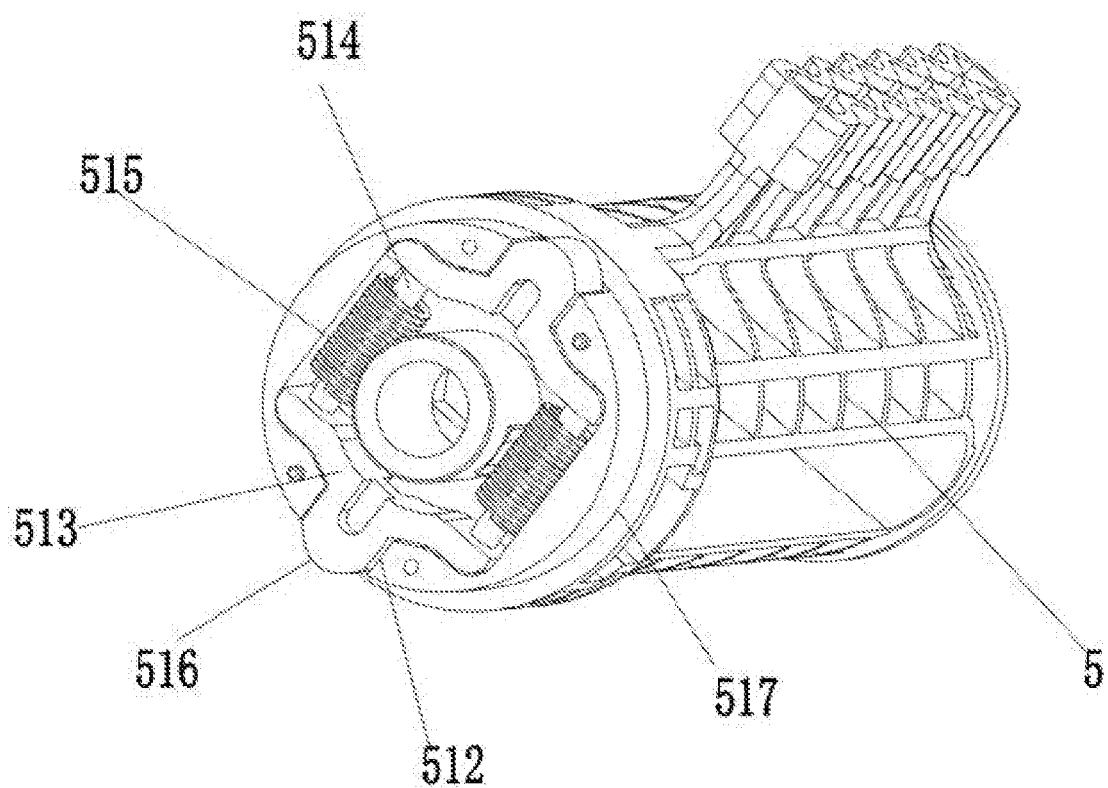
FIG. 5 is a schematic diagram of the rotating structure installed in the sliding shaft of the invention.
Figure 14:
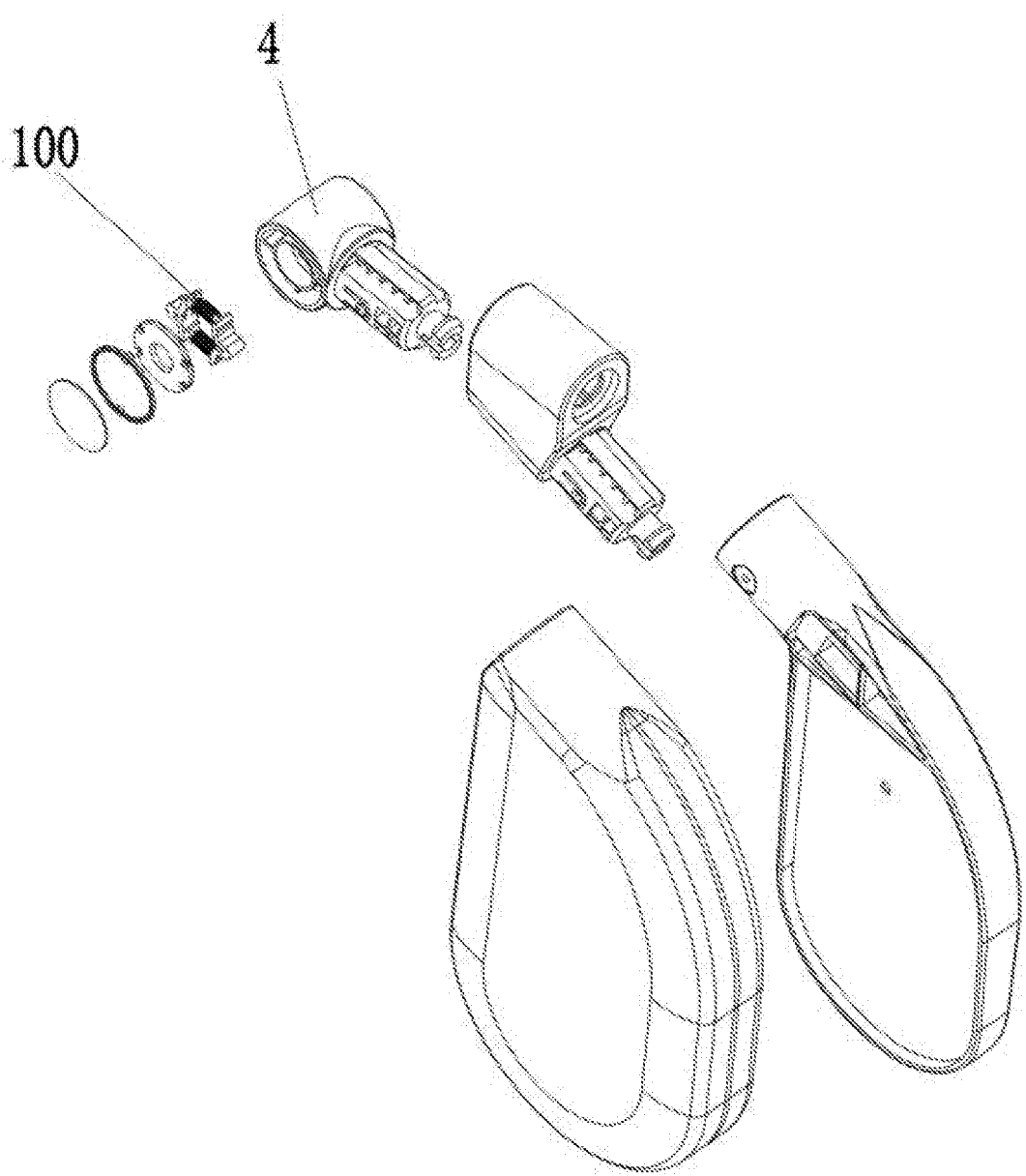
FIG. 14 is an exploded view of the support arm and the rotating shaft of the invention.

In the embodiment, as shown in FIGS. 5 and 14, the rotating structure 100 is installed in the rotating shaft 4; the end surface of the sliding shaft 5 is provided with a convex ring 517, and the middle of the convex ring 517 is provided with a middle shaft with a hole; mounting grooves 512 are symmetrically provided on the convex ring 517; the rotating structure is installed in the middle of the convex ring, and the rotating structure is partially buckled into the mounting groove 512.

The rotating structure comprises two symmetrically arranged connecting members 513; a connecting post 514 is arranged on the opposite side of the connecting member 513, and a spring 515 is installed between the connecting posts on the adjacent sides; the two ends of the spring 515 are in contact with the connecting member 514 respectively; an arc-shaped convex part 516 is formed on the connecting member, and the arc-shaped convex part 516 is buckled into the mounting groove 512 and partially protrudes out of the convex ring 511; more than one arc-shaped concave part is arranged on the inner wall surface of the rotating shaft, and the convex arc-shaped convex part 516 is buckled into the arc-shaped concave part.

The automobile headrest of the invention realizes the distance adjustment between the support arms 3 through the lateral movement of the sliding shaft 5, realizes a better lateral adjustment of the sliding shaft 5 through the design of the locking plate 6, the concave-convex part 61 and the like, and realizes a better degree of freedom and comfort.

Figure 3:
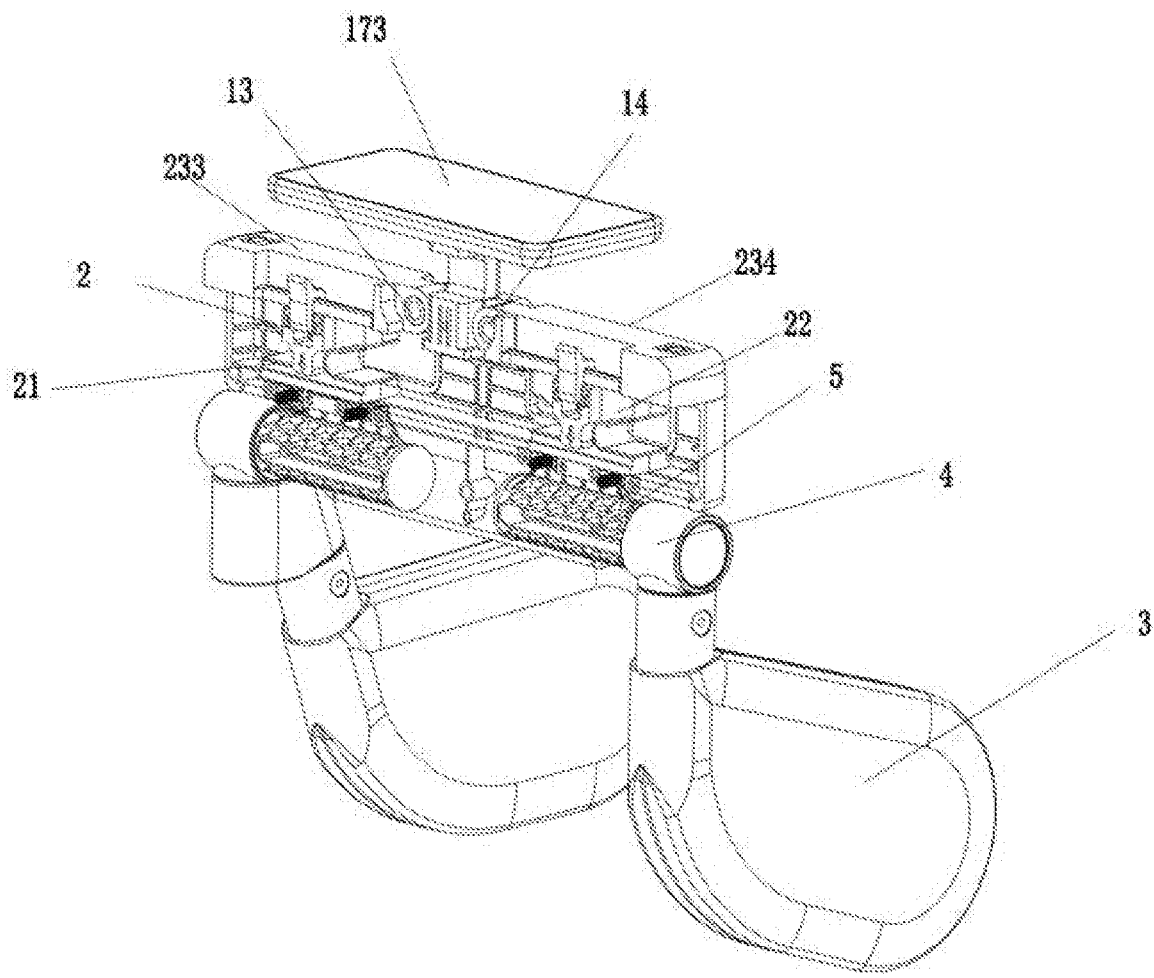
FIG. 3 is a schematic diagram of the internal assembly of the invention.
Figure 8:
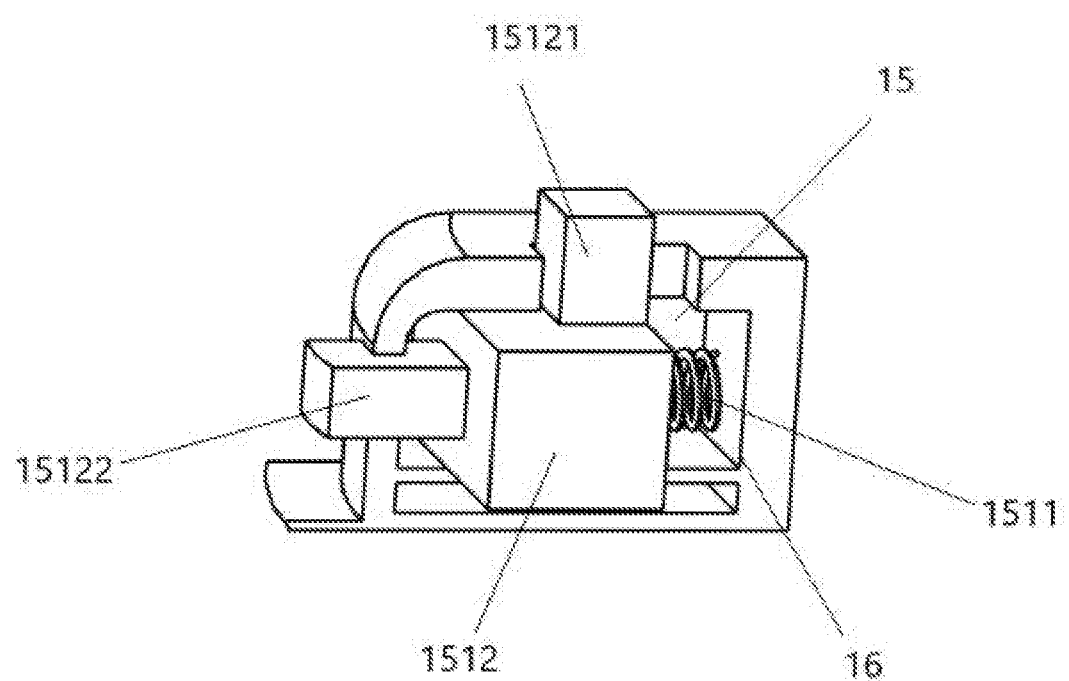
FIG. 8 is a schematic diagram of the structure of the elastic control part of the invention.
Figure 9:
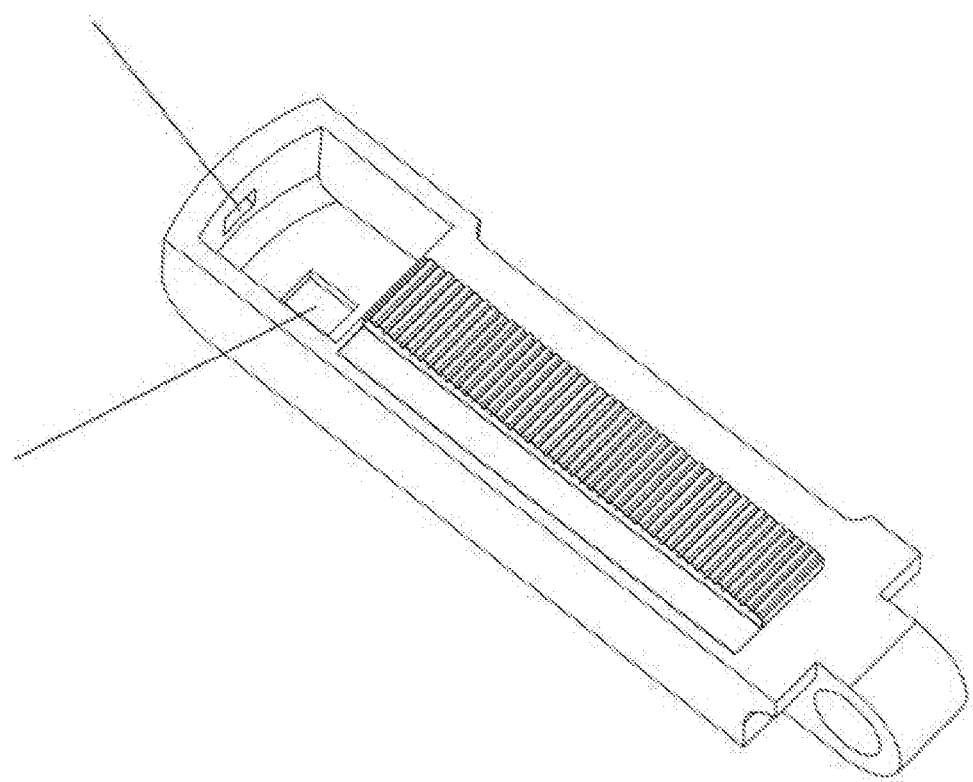
FIG. 9 is a schematic diagram of the structure of the fixing plate of the invention.
Figure 10:
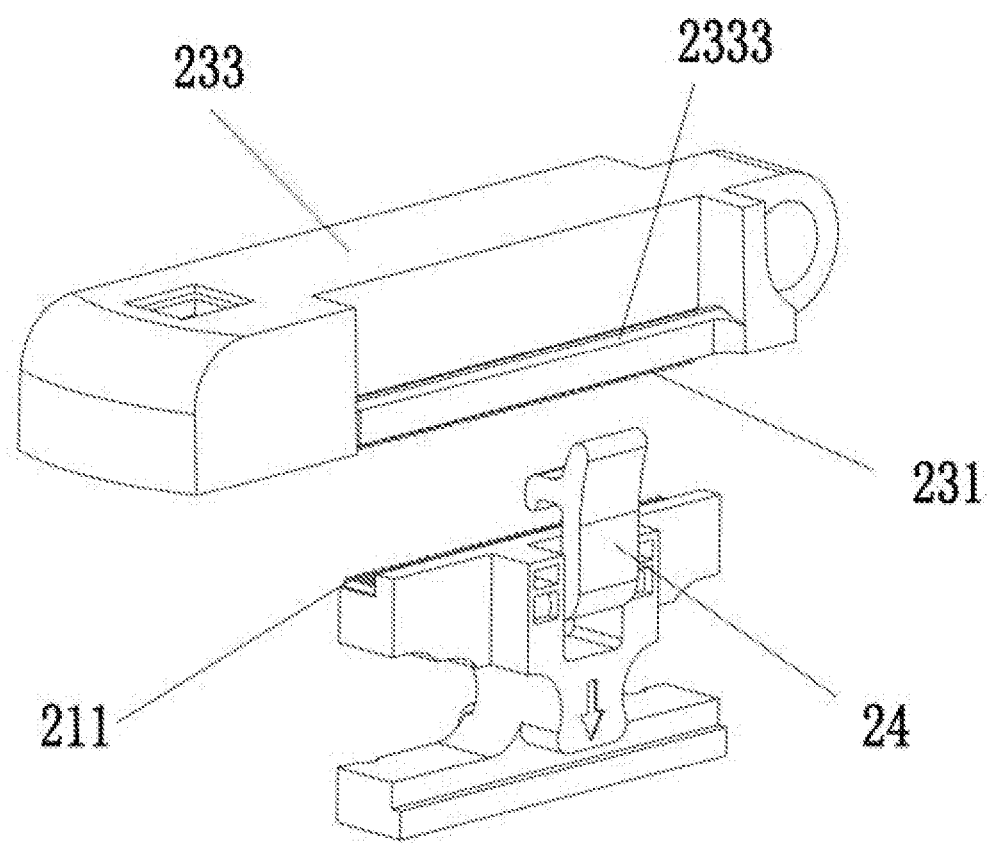
FIG. 10 is an exploded view between the seat fixing part and the fixing plate of the invention.
Figure 11:
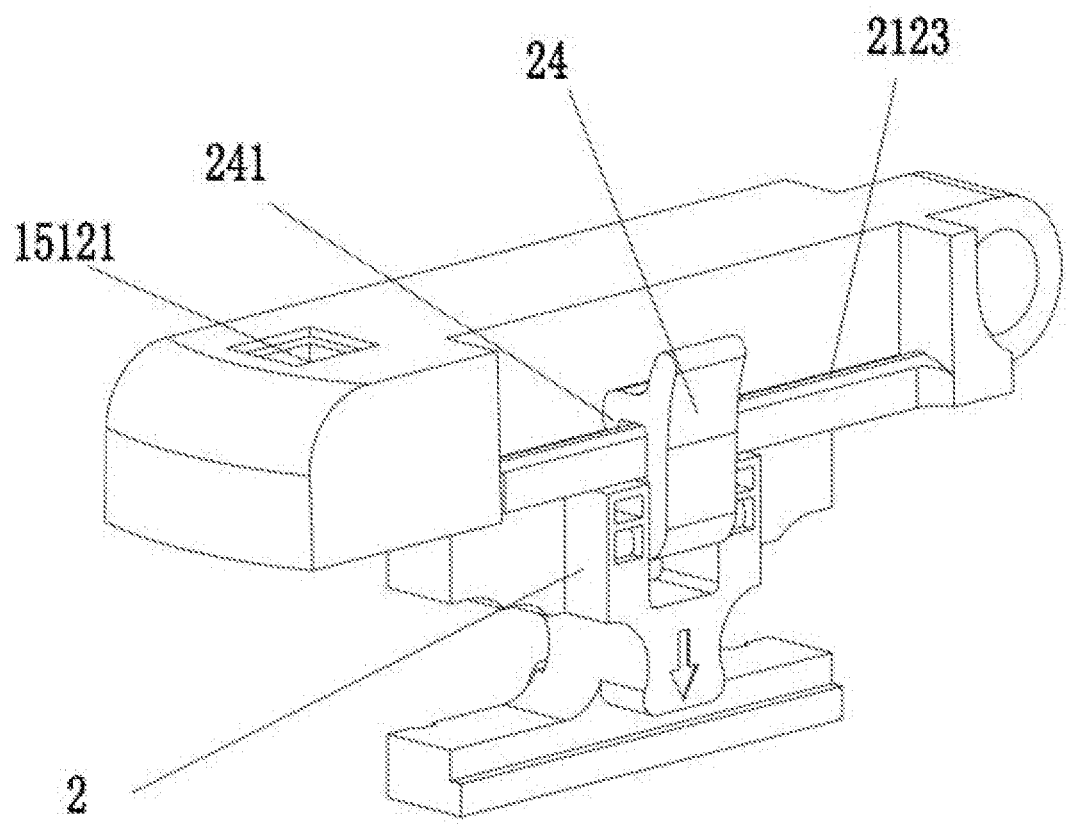
FIG. 11 is a schematic diagram of the seat fixing part and the fixing plate in FIG. 10 after being assembled together.
Figure 12:
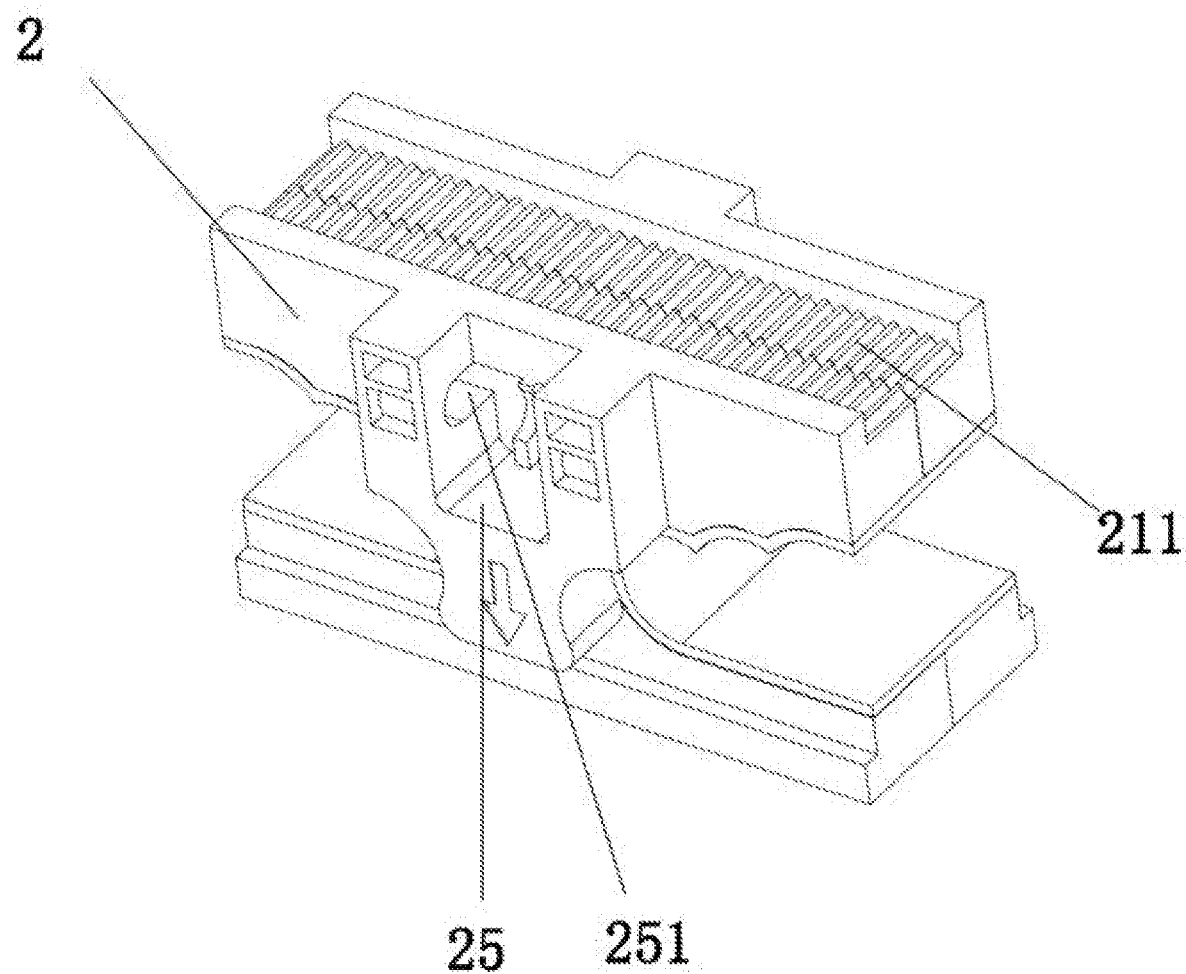
FIG. 12 is a schematic structural view of the seat fixing part of the invention from another perspective.
Figure 13:
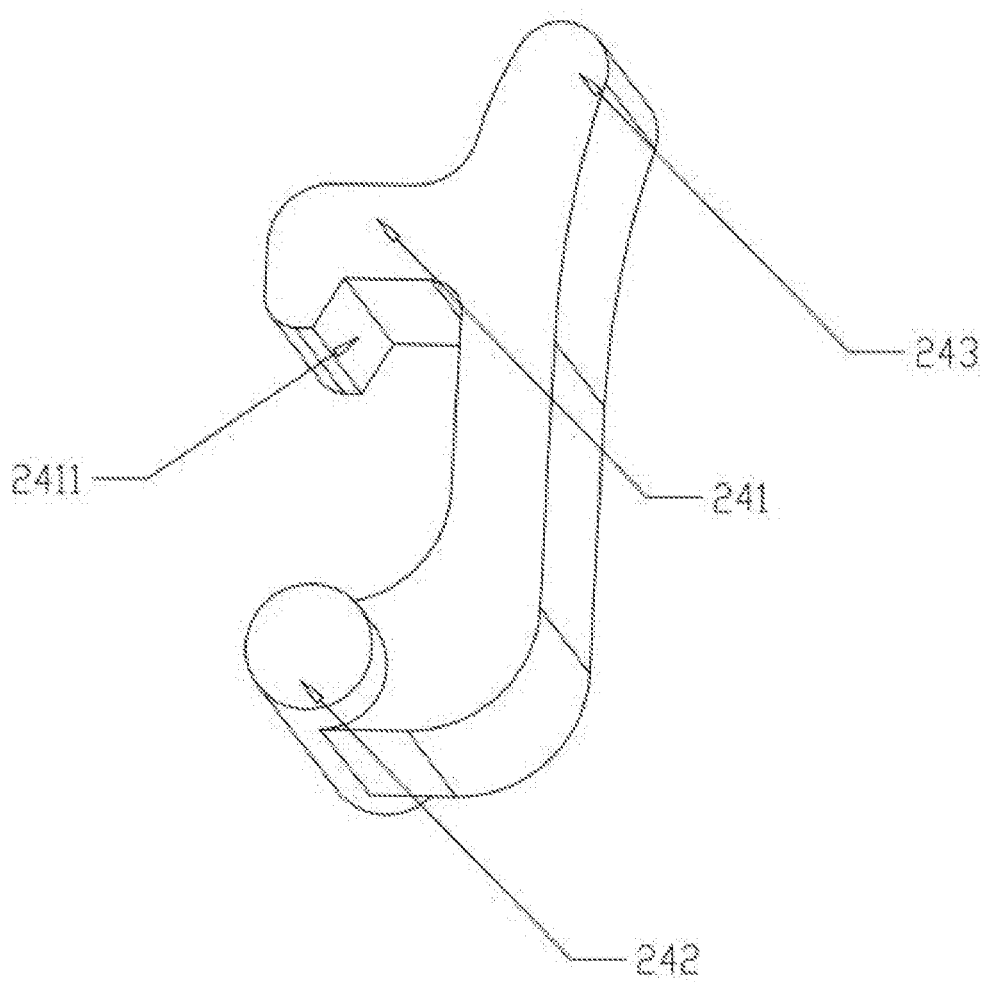
FIG. 13 is a schematic diagram of the structure of the buckling device of the invention.
Figure 17:
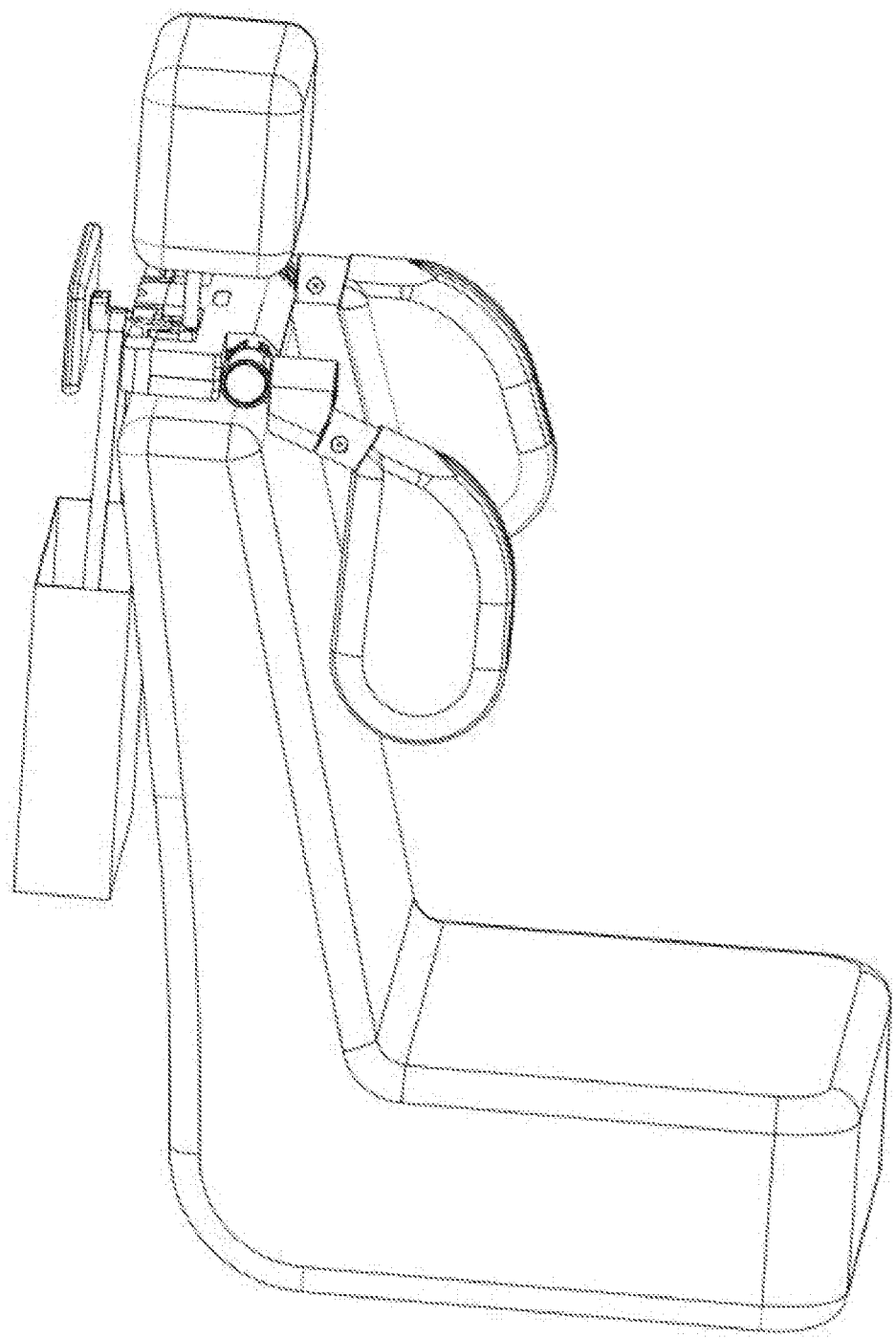
FIG. 17 is a schematic diagram of the installation of the invention.

As shown in FIG. 17, the seat fixing part is used for fixing with the fixing rod on the automobile seat;

as shown in FIGS. 1, 3, and 10, the seat fixing part 2 comprises a first fixing buckle 21 and a second fixing buckle 22, and the fixing rod on the automobile seat is clamped by the first fixing buckle 21 and the second fixing buckle 22; the first fixing buckle 21 and the second fixing buckle 22 are respectively provided with fixing clamping teeth 211; a fixing plate 23 is connected to the upper part of the shell; the fixing plate 23 is provided with corresponding clamping teeth 231, and the corresponding clamping teeth 231 are engaged with the fixing clamping teeth 211; the limiting and fixing of the first fixing buckle 21 and the second fixing buckle 22 are realized by the corresponding clamping teeth 231 provided on the fixing plate 23; the fixing of the seat fixing part 2 is realized by the fixing plate 23, the stabilization effect is better, and the engagement position of the corresponding clamping teeth 231 and the fixing clamping tooth 211 can be adjusted; the fixing plate 23 comprises a first fixing plate 233 and a second fixing plate 234; the first fixing plate 233 is hinged to the first fixing part 13 on the shell 1, and the second fixing plate 234 is hinged to the second fixing part 14 on the shell 1;

as shown in FIG. 8, a containing groove 15 is provided on the shell 1, and an elastic control part 151 is provided in the containing groove 15; the elastic control part 151 comprises an elastic member 1511 and a pushing part 1512; one side of the elastic member 1511 is connected to the elastic member baffle 16 provided on the shell 1, and the other side thereof is connected to the pushing part 1512; the pushing part 1512 comprises a pushing post 15121 and a pushing clamping post 15122;

as shown in FIG. 9, a pushing hole 2331 is provided on the first fixing plate 233 and the second fixing plate 234; the pushing post 15121 passes through the pushing hole 2331 and moves in the pushing hole 2331.

A clamping post slot 2341 is provided on the first fixing plate 233 and the second fixing plate 234, which pushes the clamping post 15122 to move inside and outside the clamping post slot 2341. The pushing post 15121 is positioned on one side of the pushing hole 2331 under the action of the elastic force of the elastic member 1511 on the first fixing part 13 and the second fixing part 14, and pushes the clamping post 15122 in the clamping post slot 2341; when the pushing post 15121 is pushed to the other side, the clamping post 15122 is pushed out of the clamping post slot 2341, the first fixing plate 233 and the second fixing plate 234 can rotate relative to the first fixing part 13 and the second fixing part 14; the adjustment of the relative position between the first fixing buckle 21 and the second fixing buckle 22 is realized after the shell 1 is separated; the fixing problem caused by the different positions of the automobile fixing posts on different automobiles is solved.

Figure 15:
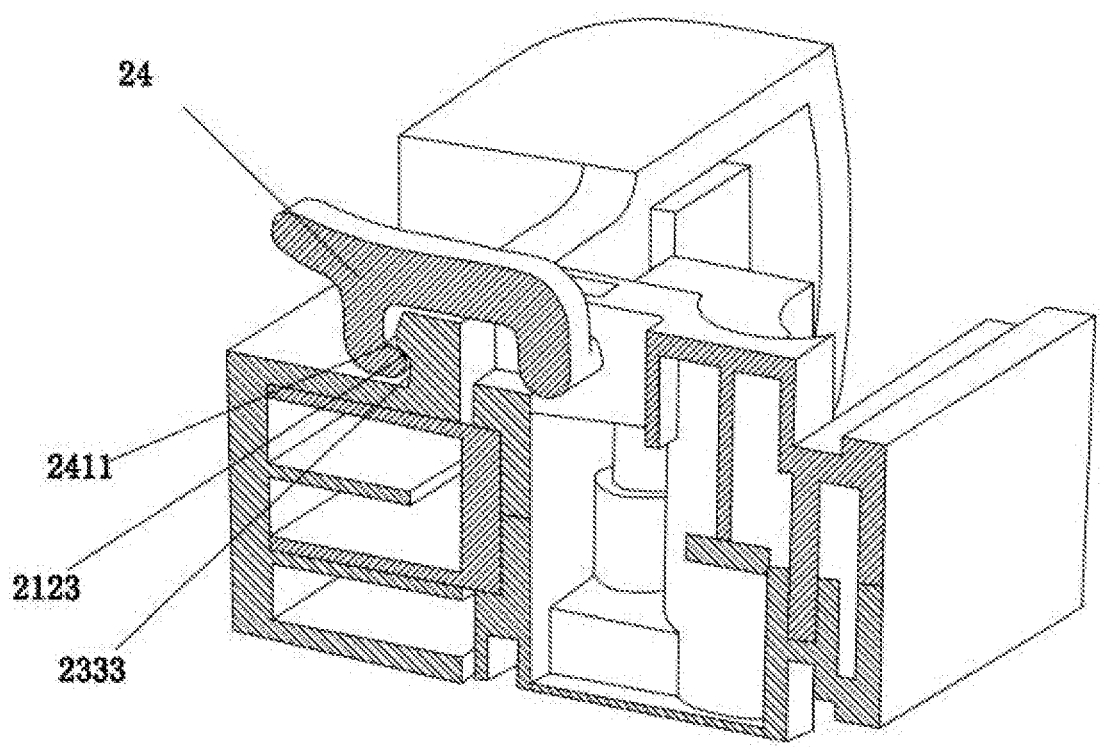
FIG. 15 is a cross-sectional view of the buckling device and the fixing plate of the invention after being buckled.
Figure 16:
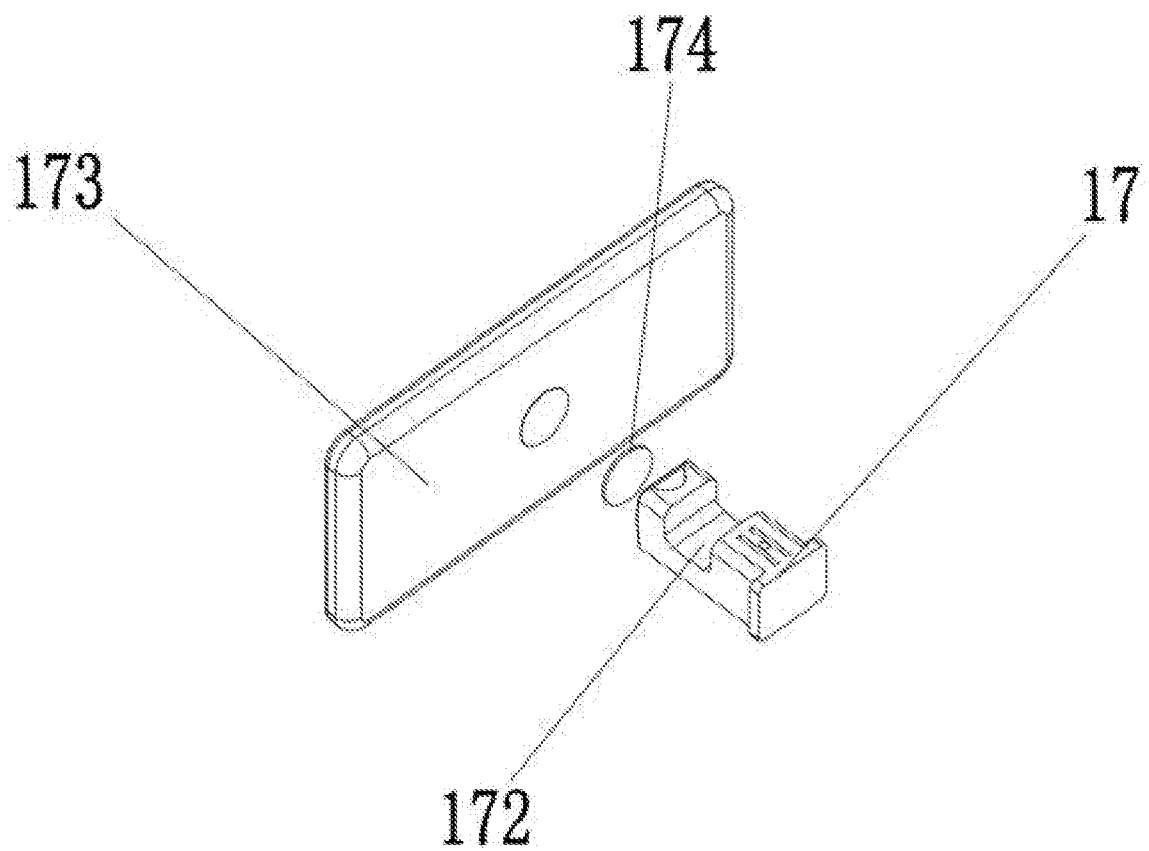
FIG. 16 is a schematic diagram of the structure of the pendant and mobile phone holder of the invention.

As shown in FIG. 16, the middle of the shell 1 is provided with a pendant sliding part, and the pendant 17 is fixed to the shell 1 through a nut structure; the pendant 17 is provided with a sliding positioning wave point, and the pendant 17 is provided with a bending part 172; the suspension and placement of objects are realized through the bending part 172; a mobile phone holder 173 is further connected to the pendant 17, and a magnetic attraction component 174 is provided on the mobile phone holder 173; the fixing of the mobile phone is realized by the adsorption of the magnetic component, as shown in FIG. 15.

As shown in FIG. 10-13, the seat fixing part 2 is further provided with a buckling device 24; one end of the buckling device 24 is hinged to the seat fixing part 2 to realize the relative rotation of the buckling device 24 on the seat fixing part 2; the other end of the buckling device 24 is provided with a buckling point 241; a buckling concave groove 2333 is provided on the first fixing plate 233 and the second fixing plate 234, and the buckling point 241 enters the buckling concave groove 2333 to engage; the buckling part 24 is further provided with a toggling part 243; the buckling point is provided with a buckling inclined plane 2411 to buckle with the inclined groove 2123 provided on the bottom surface of the buckling concave groove, as shown in FIG. 15; through the design of the toggling part 243, the operation of the buckling device 24 is better realized. The above embodiment better realizes the fixing of the seat fixing part through the arrangement of the buckling device 24, the fixing clamping teeth, and the corresponding clamping teeth. As a new connection structure and its optimization, the stabilization effect of the embodiment is better and the adjustment method is simple. A more stable connection of the seat fixing part 2 is realized through the design of the buckling device 24; when it is installed on the automobile seat to adjust the distance, loosening the buckling device 24 and allowing the seat fixing part 2 to move to adjust the position; after the position adjustment is completed, the buckling device 24 is buckled to realize the fixing of the position of the seat fixing part 2; for the above embodiment, one end of the buckling device 24 is hinged to the seat fixing part 2 to be thinner.

As shown in FIGS. 11-13 and 15, the seat fixing part 2 is provided with a containing slot 25, and two sides of the containing slot 25 are provided with rotating holes 251; the buckling device 24 is provided with a rotating post 242, and the rotating post 242 passes through the rotating hole 251 and rotates in the containing slot 25. With regard to the content of the buckling device 24, the invention also proposes the following optimization solutions: the buckling point 241 is provided with a buckling inclined plane 2411; the design of the buckling inclined plane 2411 facilitates a better separation of the buckling point 241 and the buckling concave groove 2333 provided on the first fixing plate 233 and the second fixing plate 234, and at the same time, there is a better clamping force, which enables the seat fixing part 2 to be fixed more stably.

The above are only specific embodiments of the invention, but the protection scope of the invention is not limited thereto. Any modifications or substitutions without creative efforts shall all fall within the protection scope of the invention. Therefore, the protection scope of the invention should be subject to the protection scope defined by the claims.

What is claimed is:

1. An automobile headrest, comprising a shell, support arms, and a seat fixing part,
wherein the seat fixing part is arranged on the shell for fixing with the fixing rod on the automobile seat; each support arm is provided with a rotating shaft and a sliding shaft; the sliding shaft slides in a slideway inside the shell, and one end of the sliding shaft is rotatably connected to the rotating shaft through a rotating structure; the support arms are slidably installed in the shell through the sliding shaft, and the width between the support arms is adjusted laterally through the sliding shaft, wherein the seat fixing part comprises a first fixing buckle and a second fixing buckle, and the fixing rod on the automobile seat is clamped by the first fixing buckle and the second fixing buckle; the first fixing buckle and the second fixing buckle are respectively provided with fixing clamping teeth; a fixing plate is connected to the upper part of the shell; the fixing plate is provided with corresponding clamping teeth, and the corresponding clamping teeth are engaged with the fixing clamping teeth.

2. The automobile headrest according to claim 1, wherein the fixing plate comprises a first fixing plate and a second fixing plate; the first fixing plate is hinged to the first fixing part on the shell, and the second fixing plate is hinged to the second fixing part on the shell; a containing groove is provided on the shell, and an elastic control part is provided in the containing groove.

3. The automobile headrest according to claim 2 wherein the elastic control part comprises an elastic member and a pushing part; one side of the elastic member is connected to the elastic member baffle provided on the shell, and the other side thereof is connected to the pushing part.

4. The automobile headrest according to claim 3, wherein the pushing part comprises a pushing post and a pushing clamping post; a pushing hole is provided on the first fixing plate and the second fixing plate; the pushing post passes through the pushing hole and moves in the pushing hole; a clamping post slot is provided on the first fixing plate and the second fixing plate, which pushes the clamping post to move inside and outside the clamping post slot; the pushing post is positioned on one side of the pushing hole under the action of the elastic force of the elastic member on the first fixing part and the second fixing part, and pushes the clamping post in the clamping post slot.

5. The automobile headrest according to claim 1, wherein the seat fixing part is further provided with a buckling device; one end of the buckling device is hinged to the seat fixing part to realize the relative rotation of the buckling device on the seat fixing part; the other end of the buckling device is provided with a buckling point; a buckling concave groove is provided on the first fixing plate and the second fixing plate, and the buckling point enters the buckling concave groove to engage; the seat fixing part is provided with a containing slot, and two sides of the containing slot are provided with rotating holes; the buckling device is provided with a rotating post, and the rotating post passes through the rotating hole and rotates in the containing slot; the buckling part is further provided with a toggling part; the buckling point is provided with a buckling inclined plane to buckle with the inclined groove provided on the bottom surface of the buckling concave groove.

6. The automobile headrest according to claim 1, wherein the sliding shaft is provided with a sliding part, and the shell is provided with a locking structure; the sliding part and the locking structure are fixed to realize the lateral movement of the sliding shaft; the locking structure comprises a locking plate; one side of the locking plate is provided with a concave-convex part, and the concave-convex part of the locking plate corresponds to the convex-concave part provided on the sliding part; the locking plate is compressed and fixed in the shell by screws.

7. The automobile headrest according to claim 6, wherein an elastic device is provided between the locking plate and the shell; when the protrusions in the concave-convex part contact the recesses in the convex-concave part, the elastic device gives an elastic force.

8. The automobile headrest according to claim 7, wherein the elastic device is a spring device, and the spring device is fixed by a limiting post provided on the other side of the concave-convex part of the locking plate.

9. The automobile headrest according to claim 1, wherein the rotating shaft is provided with a first insertion hole and a second insertion hole, and the support arm is arranged in one of the insertion holes.

10. The automobile headrest according to claim 1, wherein the middle of the shell is provided with a pendant sliding part, and the pendant is fixed to the shell through a nut structure; the pendant is provided with a sliding positioning wave point, and the pendant is provided with a bending part; the suspension and placement of objects are realized through the bending part; a mobile phone holder is further connected to the pendant, and a magnetic attraction component is provided on the mobile phone holder; the fixing of the mobile phone is realized by the adsorption of the magnetic component.

11. The automobile headrest according to claim 1, wherein a sliding groove is provided in the middle of the sliding shaft, and a sliding rod is bulged inside the shell; the sliding rod is slidably buckled into the sliding groove.

12. The automobile headrest according to claim 1, wherein the rotating structure is installed in the rotating shaft; the end surface of the sliding shaft is provided with a convex ring, and the middle of the convex ring is provided with a middle shaft with a hole; mounting grooves are symmetrically provided on the convex ring; the rotating structure is installed in the middle of the convex ring, and the rotating structure is partially buckled into the mounting groove.

13. The automobile headrest according to claim 12, wherein the rotating structure comprises two symmetrically arranged connecting members; a connecting post is arranged on the opposite side of the connecting member, and a spring is installed between the connecting posts on the adjacent sides; the two ends of the spring are in contact with the connecting member respectively; an arc-shaped convex part is formed on the connecting member, and the arc-shaped convex part is buckled into the mounting groove and partially protrudes out of the convex ring; more than one arc-shaped concave part is arranged on the inner wall surface of the rotating shaft, and the convex arc-shaped convex part is buckled into the arc-shaped concave part.

* * * * *